July 2, 1957  E. H. ZAHN  2,797,482
DENTAL APPLIANCE
Filed Sept. 15, 1953  2 Sheets-Sheet 1
*RUGAE BAR CASE*
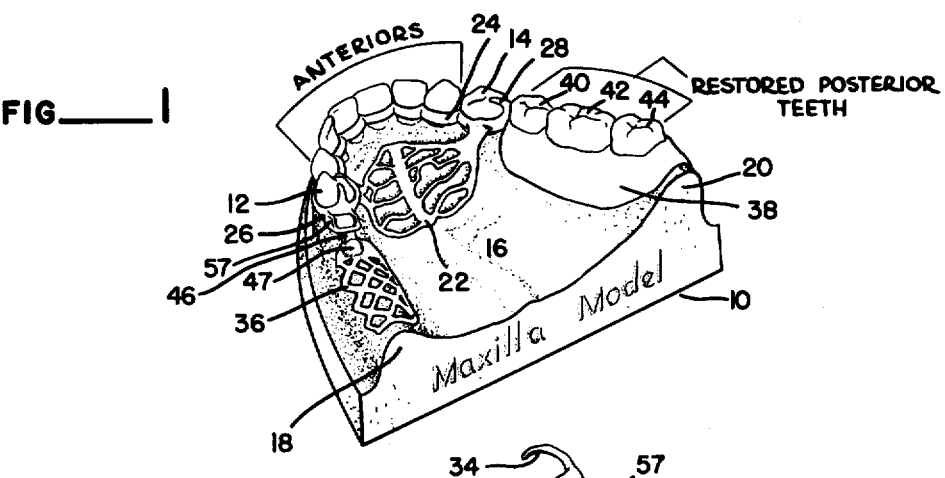
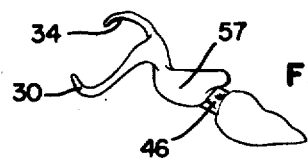
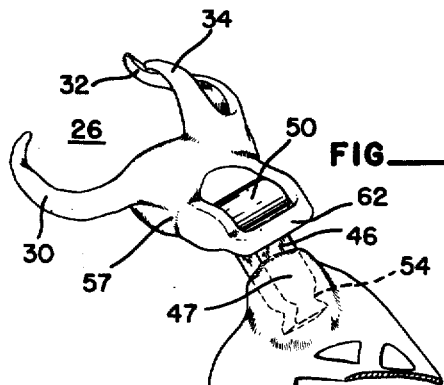
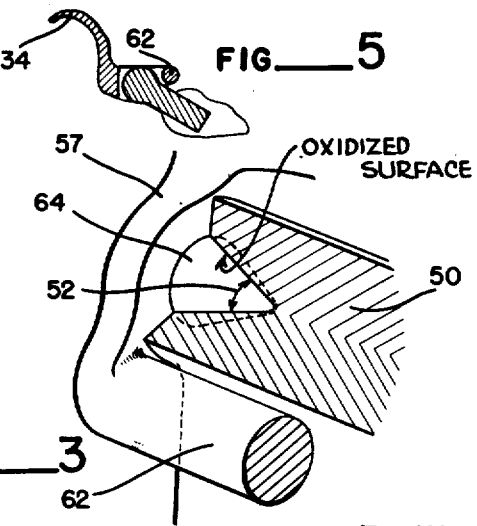
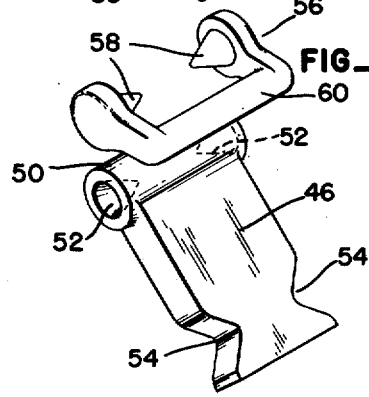
ERIC H. ZAHN
INVENTOR.
BY Smith & Tuck July 2, 1957     E. H. ZAHN     2,797,482
DENTAL APPLIANCE Filed Sept. 15, 1953     2 Sheets-Sheet 2

LINGUAL BAR CASE WITH INTEGRATED SADDLES

ERIC H. ZAHN
*INVENTOR.*

BY Smith & Tuck

United States Patent Office 2,797,482
Patented July 2, 1957

2,797,482
DENTAL APPLIANCE

Eric H. Zahn, Kirkland, Wash., assignor to Austenal, Inc., Chicago, Ill., a corporation of New York Application September 15, 1953, Serial No. 380,162

26 Claims. (Cl. 32—5)

This invention relates to improvements in a dental appliance and, more particularly, to a distal extension hinge for dental appliances of the type in which tooth restorations are supported within the mouth by means of clasps and anchoring devices attached and fitted to natural teeth.

The preparation and installation of partial dentures or dental appliances is an extremely complex and detailed undertaking involving many skills and arts on the part of the technician as well as the dentist. By well known means and processes the dentist forms a model of either the maxilla (the upper jaw) or the mandible (the lower jaw) which will accurately reflect the exact conditions in a patient's jaw. In such a model will be duplicates of the natural teeth in place as well as the edentulous areas along the ridge which are to be filled by the dental restoration. Upon such a model the technician lays out and sketches the outline and design of a metallic frame to which will be attached the restoring teeth. His design takes into consideration the necessary clasps and saddles and palatal tie bars that will effectively position the dental appliance within the mouth and retain it there under conditions of mastication and the like:

The outlined design on the model is "waxed" by the application of bars and sheets and strips and rods of wax to the technician's design. This wax pattern is applied to the model by heating, shaping, trimming and smoothing wax until the desired design is achieved. Subsequently the waxed pattern and the model supporting it is invested or flasked, usually within a metal ring. Following investment the wax is burned out of the invested mold and investment in the well known manner. Thus is provided a cavity which is an exact duplicate of the desired shape of a metallic frame to be used in a dental appliance.

The cavity within the investment and around the model is then filled with molten metal from a crucible which is carried to the inner molds by suitable passages. Following this formation and a cooling of the casting, the investment is cracked and the model and the metallic frame may be removed for the technician's further work involving cutting and the polishing and shaping and, in general, finishing of the denture.

It is a well known fact that when a distal extension saddle of a denture is applied in a cantilevered manner to a ridge in the mouth it rests upon tissue that has underlying bone structure. During function of the appliance, as when food is masticated, pressure is applied on the tissue overlying the bone and any denture resting thereon naturally moves closer to and then away from the bone due to the resiliency of the tissue. This movement can be in a 2 to 4 mm. range. In the case of removable dental appliances, in which the appliance is held to the natural teeth by clasps, a tilting or twisting action is applied upon the abutment teeth that support the appliance due to the immobility of the clasps and give of the distal extension. Over a period of time the twisting of the abutment teeth results in their being loosened to such an extent that their extraction becomes inevitable and the patient is then required to have a new appliance made incorporating further restored teeth. It is conceivable that eventually the person would lose all his teeth to which a removable or partial denture could be attached.

In an effort to overcome objections to rigid partial denture constructions, and to minimize deleterious results of lever-action and micro-mobility of the appliance, or a part thereof, upon natural abutment teeth in the mouth, stress-breakers or stress-relieving structures have been proposed.

Prior schemes have been designed for relative vertical movement between the connected denture parts; movement in other directions being provided by lost motion in the connection. Appliances embodying schemes such as this are difficult and costly to produce and have not been generally accepted.

Other schemes involving, for example, split bars, soldering, welding and the like, have also been proposed. Appliances embodying these latter schemes have also been difficult and costly to produce and have not been as satisfactory as desired. Moreover, due to the small confines within which to work in appliances of this sort, the problem of forming pivotal connections in appliances of this sort, has been a difficult one. Soldering, welding, and the like, have usually been resorted to in forming such connections notwithstanding the difficulties and cost involved.

One of the main objects of the present inventon is to provide an improved stress-relieving attachment for partial dentures and the like which will overcome shortcomings and difficulties encountered with prior stress-relieving schemes.

Another object is to provide an improved stress-relieving attachment which is less expensive and may be formed quickly and expeditiously; also a stress-relieving attachment that is adaptable to the "lost-wax" technique of metal casting; may be produced by less skilled and less experienced operators or technicians, and may be readily adjusted to the patient's mouth.

Another object is to provide an improved method of forming a hinge connection, for example, between the two desired members of the appliance, by casting a first hinge part on one of the members and in direct hinge coaction with a second complementary hinge part on the other member and with the hinge connection allowing relative pivotal movement between the members.

Another object is to prevent fusion of one hinge part to the other hinge part and assure free pivotal movement of one hinge part relative to the other hinge part by forming an oxidized surface on one hinge part prior to casting the other hinge part in complementary hinge coaction therewith.

Another object is to provide for utilizing the slight shrinkage which takes place upon cooling of the hinge part which is cast in hinge coaction with the other hinge part, to assure free pivotal movement of one hinge part relative to the other hinge part.

Another object is to provide a hinge member which may be distributed as such, for example, to dental laboratories and the like, and which comprises a hinge member having a first hinge part formed thereon for coaction with a complementary hinge part adapted to be cast in hinge coaction with the first hinge part, and a pattern part corresponding generally to the shape of the complementary hinge part and carried on the hinge member in complementary coaction with the first hinge part; such pattern being eliminatable by heat from a mold.

Another object is to provide a hinge member of the character set forth wherein one of the first hinge and pattern parts is of female form and the other part in complementary coaction therewith is of male form.

Another object is to provide a hinge member of the character set forth wherein at least the portion of the first hinge part in complementary coaction with the pattern is oxidizable by the temperatures used in eliminating the pattern from the mold and in casting the complementary hinge part.

Another object is to provide a hinge member of the character set forth wherein the first hinge part is in the form of a generally spherical pivot head and the pattern is in the form of a generally spherical socket fitting over said head for producing a generally spherical socket on the other member and free to permit turning movement of said head in said socket.

These and other objects of the invention will be more apparent during the course of the following specification which describes in detail the invention, and certain modifications relating thereto, when read in connection with the accompanying drawings, showing preferred and modified forms of the invention.

In the drawings:

Figure 1 is a perspective view of a dental model having mounted thereon a partially constructed rugae bar case, and typifying an application of my invention in the actual production of dental appliances;

Figure 2 is an enlarged view in perspective of a hinge construction for distal extensions in dental appliances according to my invention;

Figure 3 is an enlarged perspective view of a portion of the hinge shown in Figure 2 with portions broken away and others shown in section for convenience of illustration;

Figures 4 and 5 are detail views in side elevation and vertical section respectively from the side showing the hinge action obtained by the device of Figure 2;

Figure 6 is an exploded view in perspective of the parts of a metallic hinge element and its prepared wax pattern of the mating part;

Figure 7:
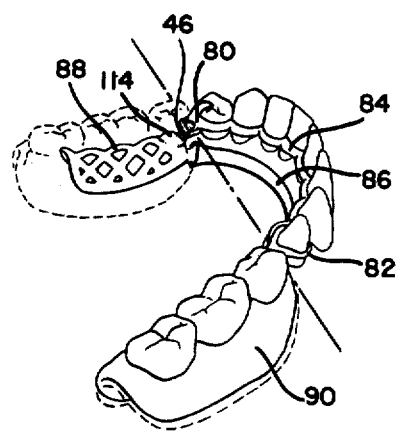
Figure 7 is a perspective view of a partially constructed lingual bar case in which the distal extension saddles are integrated and stress between them and the clasp elements of the dental appliance is broken.

Referring now to Figure 1 of the drawings, it will be seen that there is shown a maxilla model 10 of a person's mouth in which the natural teeth comprise the six anteriors and the first bicuspid 12 and 14 on opposite sides. In the model is represented the palatal area 16 and the ridge areas 18 and 20, which are edentulous, to which is to be fitted the dental restoration including posterior teeth to take the place of the natural teeth which have been removed.

It is to be borne in mind that in Figure 1 the dental technician has previously waxed his model and in the process has formed in wax the pattern for the rugae bar 22, continuous clasp 24, and the tooth clasps 26 and 28. For purposes of illustration of the construction of the tooth clasp 26 reference is made to Figure 2 is which it will be seen that clasp 26 comprises two T clasp arms 30 and 32 and the occlusal rest 34 all of which are carefully fitted to the abutment tooth 12 in such a manner that in the patient's mouth this clasp is stationary. Clasp 28 is similar in construction but not necessarily identical in detail due to variations in tooth form and the exigencies of the undertaking. Extending between clasp 26 and clasp 28 is the continuous clasp 24 which is a metallic element of scalloped shape that fits closely to the lingual surfaces of the anteriors and is rigid with the clasps. To impart further rigidity, in this typical case, the rugae bar 22 that is shaped to fit the irregular ridges in the hard palate of the upper jaw has been formed and anchored at either side to the tooth clasps 26 and 28. So much of the structure as has been previously described is essentially the supporting and mounting framework of the dental appliance of Figure 1, and good practices result in this frame being stationary.

Attached to the framework is the saddle skeleton 36 which comprises the openwork base for a dental restoration such as shown on the right side of Figure 1 and includes the plastic saddle 38 and restored posterior teeth 40, 42 and 44. The plastic saddle is supported by a saddle skeleton 36, which in the manner well known to dental technicians and dentists is embedded within the plastic material forming the saddle. The saddle frames are generally aligned with the longitudinal axis of the ridge.

It will be apparent that the metallic framework that has been described is preferably formed of metal. It may be gold or palladium but, for the purposes of my work, I prefer to use a chrome-cobalt-molybdenum alloy known commercially as "Vitallium" because of its extreme strength even in minute cross sections and in thin sections as well as its resistance to acids and alkalies and to extreme usage. This metallic framework has been produced in the manner previously and briefly described in this specification in accordance with the lost-wax method.

In dental restoration according to previous practices, in which the distal extension saddles are rigidly attached to the clasps and anchoring framework of the appliance, it will be apparent that stress is localized at the joinder between the saddle and the frame. This is caused during function by the cantilevered relationship of the saddle to its supporting frame and the further fact that the underlying tissue on the ridge can give a few millimeters. Thus a serious twisting and overturning moment is applied to the abutment teeth such as 12 and 14, in the instance of Figure 1. While attempts have been made to break the stresses at the point of joinder between the saddle extension and the framework, my rather considerable experience in this field fails to disclose the use of a stress breaking arrangement that involves a hinge or pivotal connection of the character herein set forth. For this reason, I believe that no previous worker in this field has been able to devise a method of suitably forming the hinge within the extreme confines in which he must work and within the limitations imparted by the techniques and processes employed.

Figure 8:
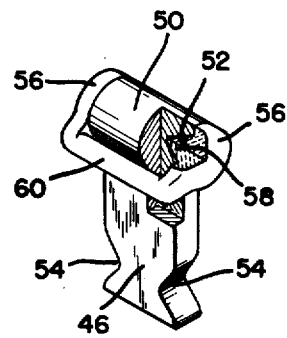
Figure 8 is an enlarged perspective view of a metallic hinge element as it appears ready to be waxed into the pattern framework of a dental restoration.

Referring now to Figure 8, wherein is shown an enlarged view of the hinge elements employed in Figures 1 and 2, the metallic hinge member comprises the shank 46 having a pivot head 50, provided at either end with an axial aligned pair of pivot sockets 52. In this case the sockets are conical in shape. The opposite end of shank 46 has notches 54, 54 that aid mechanical joinder with metal which is later cast to the shank, thus producing a firm anchor. Each end of the pivot head 50 has a wax trunnion pattern 56 having a trunnion 58 fitted to each of the recesses 52. The trunnion heads 56 are joined by the wax stop bar 60, which is spaced slightly away from head 50. The combined metal and wax device shown in Figure 8 is the basic element of my hinge construction and is employed by technicians in forming the hinge according to the lost wax method, furnishing to such technician a preformed wax model of a very intricate hinge part.

During the waxing-in process upon a model and after the clasps, continuous clasp, and lingual or rugae bars have been formed, it is appropriate for the hinge member of Figure 8 to be placed. This is done by means of wax rods and bars that are used to fill and span the space between the wax heads 56 and the wax boss pattern 57 for the clasp 26, for example. Care must be exercised to insure that the underside of the shank 46 is mounted in slightly spaced apart relation to the adjacent surface of the model in order that investment material may flow thereunder. The technician then proceeds to wax in his saddle skeleton and in so doing applies wax around the end of the shank 46 having the notches 54 in exact duplication of the pattern for that portion of the saddle as his design requires.

When the hinge element of Figure 8 is waxed-in the appearance on the model is as shown in Figure 2, the latter, it being understood, here comprising a metallic reproduction arrived at in a later stage in the process of producing the dental appliance. A portion of the shank 46 is exposed between the stop bar 62 and the nearest adjacent portion of the saddle skeleton 36. This spacing is provided during the waxing operation and permits the investment material, as has been previously described, to pass under and around the shank 46 to enclose and invest it. Thus when the model is fully invested and the wax is being burned out in an oven the shank does not become displaced for subsequent casting operations in the formation of the appliance.

The burning-out operation with the chrome-cobalt-molybdenum alloy Vitallium is conducted at a temperature of 2,000° to 2,150° F. during which operation the wax within the investment is driven off and the cavity formed. At this time the exposed portions of the chrome, cobalt and molybdenum hinge member becomes oxidized on their surfaces to the advantage of the subsequent operation of forming the hinge. When the metal that becomes the trunnions contacts the metal which forms the trunnion recesses 52 the oxidized surface prevents the fusion of the formed metal and the cast metal and the parts of the pivot head are free for pivotal movement.

Another phenomena of the operation which I have discovered is that the better hinge joints are formed of a pivotal member, that is subsequently cast to the preformed hinge element, that is a male member rather than the female member. I have noticed that in the casting operation female members have a tendency to contract upon cooling and produce an extremely tight joint so that if there are slight imperfections in the pivotal surfaces a proper hinge action is not easily obtained. For this reason I have designed the hinge, as shown in Figure 3, wherein the oxidized surface of the pivot that is to receive the molten metal is a female element. When the molten metal is cast into the cavity 52 and it cools a slight shrinkage results and permits the production of a free hinge.

On the other hand, the notched end of shank 46 being a male member, which is also oxidized, receives the fluid metal so that when the latter cools it shrinks into a tight mechanical joinder and despite the fact that fusion does not actually take place, a sufficiently rigid joint results and a practically immovable anchor of 46 in boss 47 of saddle 36 is obtained.

Referring now to Figure 7, one will see the abutment tooth clasps 80 and 82, the continuous clasp 84, and the lingual bar 86. Bar 86 extends between a skeleton saddle 88 and a similar saddle (not shown) embedded in the dental restoration 90 in the near portion of Figure 7. Since the lingual bar 86 is rigidly associated at its ends with the saddles of the dental appliance it will be apparent that it is necessary that the axis of pivot of the two hinges 46 (one only of which is shown) must be in alignment since the posterior teeth of the dental appliance must move together.

The production of the appliance of Figure 7 is in all other respects similar to that which has been typically described, based upon the showing of Figures 1 through 5.

Figure 10:
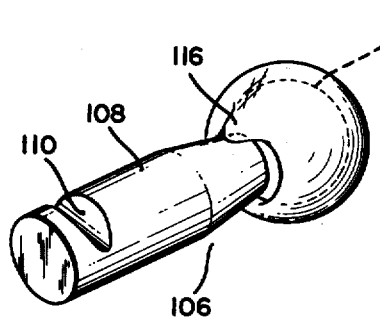
Figure 10 is an enlarged perspective view of the preformed metallic hinge element employed in the construction of Figure 9, as it appears previous to being waxed into a pattern framework of a dental appliance.
Figure 9:
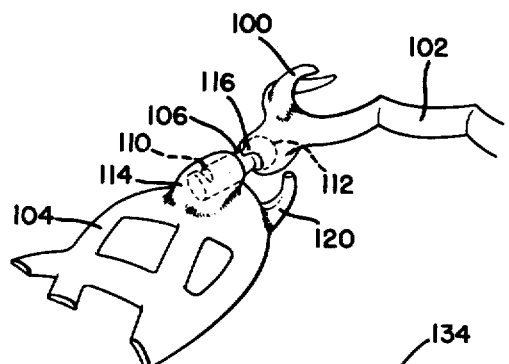
Figure 9 is an enlarged fragmentary perspective view showing a modified form of hinge element, according to the teachings of my invention.

In Figure 9 wherein is illustrated a modified form of my invention, the tooth clasp 100 has attached thereto the continuous clasp 102 and, between this structure and the skeleton saddle 104 is provided the hinge member 106 which, as shown in Figure 10, comprises cylindrical shank 108 having notch 110, and the spherical head 112. Shank 108 and its notch 110 is embedded in the metallic boss 114 of a saddle in the manner previously described. During the waxing-in stage of the production of a dental appliance according to Figure 9, the spherical head 112 of the hinge member 106 is encased in a wax coating similar to an acetabulum that closely fits the spherical surface. The acetabulum has a protuberance or stop 116 in the shape of a widow's peak that overlies the uncovered portion of the head 112 adjacent the shank. When the wax head 112 is waxed into the wax model of the clasp 100 a joinder in the manner previously described is formed. Note also that a portion of the shank 108 is exposed so that it may be properly invested in ceramic material for retention during the burning-out and casting operations.

Figure 11:
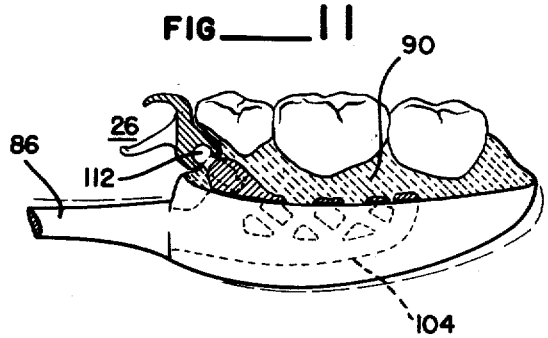
Figure 11 is a vertical sectional view with portions broken away for convenience of illustration showing a side of a dental appliance according to the teaching of the device of Figures 9 and 10.

Skeletal saddle 104 includes, in this case, a horn stop 120 which serves as an abutment to prevent or limit undue movement of the reproduction. The overlying horn 116 may be seen in Figures 9 and 11 to press upon shank 108 of the hinge element and thus serves to limit hinging action in that direction without particularly interfering with lateral or downward hinging action of the skeleton frame relative the tooth clasp and continuous clasp.

Figure 12:
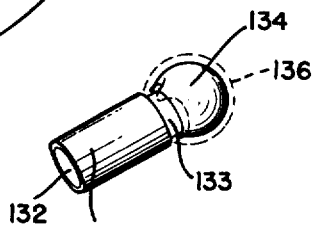
Figure 12 shows a hinge element of the type shown in Figure 9 with certain modifications.

In Figure 12 I have shown a modified form of the hinge element from that of Figure 10. The modification consists essentially in the provision of a platinum sleeve 130 around the Vitallium shank 132 which has the spherical head 134 that is provided with the waxed head or acetabulum 136, as previously described. The utility of the structure shown in Figure 12 is a result of the phenomena of the nonoxidizing characteristic of the platinum sleeve 130. The sleeve 130 is invested in the usual manner in a mold which is shaped to form the head 134 and the exposed neck portion 133 of shank 132. When the sleeve 130 is properly invested and the mold is burned out, no oxidation takes place upon the platinum surface. Platinum and Vitallium will fuse together and this makes it possible to cast Vitallium shank 132 in sleeve 130 and also the exposed neck portion 133 above the sleeve and the head 134.

When the device of Figure 12 is later mounted in an investment a Vitallium cast saddle boss, as 114, will also fuse to sleeve 130 and the use of a notch 110 or other irregular shape is obviated.

The stops 60 and 116 serve to limit movement of the saddle portion of the dental appliance away from the ridge to which it is fitted. A freely hinged saddle, it is apparent, could drop away from the upper jaw and would do so each time the user opened his mouth. Stop 60 and 116 under such conditions is contacted by the shank of the hinge member adjacent thereto and limits its undesirable motion.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. A dental appliance, comprising: a clasp section for attachment to an abutment tooth, a restoration section adapted to saddle a ridge adjacent such abutment tooth and independent of said clasp section, and a hinge coupling between said clasp and restoration sections, said hinge comprising a pivot arm integral with said restoration section and having a spherical pivot head, means forming a spherical socket carried by said clasp section and receiving said pivot head, and an abutment horn integral with said socket means and operable on the shank of said pivot arm at a point spaced from the axis of pivot to limit hinging action of said sections tending to withdraw the restoration section from its associated ridge more than a predetermined distance.

2. The subject matter of claim 1 in which said restoration section has a stop disposed to bear on said clasp section to limit pivotal movement of said section pressing the restoration section to its associated ridge.

3. The method of forming a hinge connection between a first hinge part composed of heat oxidizable metal and a second hinge part composed of metal, which comprises, heating said first hinge part to oxidize the surface thereof, and casting the second hinge part in direct hinge coaction with the oxidized surface of said first hinge part, whereby said oxidized surface prevents fusion of said second hinge part to said first hinge part and assures freedom of pivotal movement between said hinge parts.

4. The method of forming a hinge connection between a pair of members, which comprises, forming an oxidized surface on a first oxidizable metallic hinge part on one of said members, and casting a second complementary metallic hinge part on the other member and in direct hinge coaction with said oxidized surface of said first hinge part and with said oxidized surface presented to the coacting portion of said second hinge part and acting to prevent fusion of said second hinge part to said first hinge part and to assure free pivotal movement of one of said members relative to the other member about the hinge connection between said hinge parts.

5. The method of forming a hinge connection between a pair of members, which comprises, forming a first oxidizable metallic hinge part on one of said members, forming a pattern of a complementary second hinge part in cooperation with said first hinge part and of material eliminatable by heat from a mold, investing said first hinge part and said pattern in investment material to form a mold, subjecting said mold to heat sufficient to oxidize the exposed surface of said first hinge part, eliminating said pattern from said mold to form a casting cavity in said mold during subjection of said mold to such heat, and casting a second complementary metallic hinge part in said cavity and on the other member and in direct hinge coaction with the oxidized surface of said first hinge part, whereby said oxidized surface prevents fusion of said second hinge part to said first hinge part and assures free pivotal movement of one of said members relative to the other member about the hinge coaction between said members.

6. The method of forming a pair of members and a hinge connection therebetween, which comprises, forming a hinge member with a first oxidizable metallic hinge part and an integral non-oxidizable metallic anchoring part, casting one of said members to said anchoring part and fusing the same thereto, heating said first hinge part to oxidize the surface thereof, and casting a second complementary metallic hinge part integral with the other member and in direct hinge coaction with the oxidized surface of said first hinge part and with said oxidized surface presented to the coating portion of said second hinge part and acting to prevent fusion of said second hinge part to said first hinge part and to assure free pivotal movement of one of said members relative to the other member about the hinge connection between said hinge parts.

7. A hinge member having formed thereon a first hinge part composed of heat oxidizable metal for coaction with a second complementary hinge part adapted to be cast in hinge coaction with said first hinge part, and a pattern part corresponding generally to the shape of said complementary hinge part and carried on said hinge member in complementary coaction with said first hinge part for distribution as a unitary assembly therewith, said pattern part being composed of material eliminatable by heat from a mold and being in direct contact with the heat oxidizable metal of said first hinge part and eliminatable from the mold during application of heat sufficient to form on said first hinge part an oxide coating for preventing fusion of the second complementary hinge part to said first hinge part in casting the second complementary hinge part in hinge coaction with said first hinge part, whereby freedom of pivotal movement is assured between said first hinge part and said second complementary hinge part.

8. A hinge member according to claim 7 wherein one of said first hinge and pattern parts is of female form and the other part in complementary coaction therewith is of male form.

9. A hinge member according to claim 7 wherein the first hinge part is in the form of a generally spherical pivot head and the pattern is in the form of a generally spherical socket fitting over said head for producing a generally spherical socket on the other member and free to permit turning movement of said head in said socket.

10. A hinge member according to claim 7 wherein the pattern part has a portion composed of material eliminatable by heat from a mold and corresponding generally to the shape of stop means to be formed on the second complementary hinge part.

11. A hinge member according to claim 7 wherein the first hinge part and the second complementary hinge part are of form for hingedly connecting parts of a dental appliance and are composed of a cobalt-chromium alloy.

12. A hinge member according to claim 7 wherein one of the first and second complementary hinge parts is in the form of a generally spherical head acting pivotally within a generally spherical socket on the other of said first and second complementary hinge parts.

13. A dental restoration having a clasp section to engage an abutment tooth, a restoration section to cover a ridge of the mouth, and a stress-breaker therebetween, comprising: a metallic first hinge member having a shank anchored to said restoration section and a pivot head at the free end of said shank having an oppositely open pair of axially aligned bearing cups; a metallic trunnion hinge member forming a part of said clasp section having a pair of axially aligned trunnions positioned in said bearing cups and having means independent of said clasp section connecting the trunnions and including a stop bar extending laterally of said shank at a point spaced from said pivot head to form an abutment for said restoration section limiting movement away from said ridge.

14. The subject matter of claim 13 in which each bearing cup is formed as an inwardly directed cone and in which each trunnion is generally conical and fits the associated bearing cup.

15. Means for forming a stress-breaker in a dental restoration that includes a clasp section to engage an abutment tooth and a restoration section to straddle a ridge of the mouth adjacent such abutment tooth, comprising: a metallic first hinge member having a shank to be anchored to said restoration section, and a pivot head at one end of said shank having an oppositely open pair of axially aligned bearing cups; a trunnion hinge member pattern, to be reproduced as a cast-in-place hinge member carried by said clasp section, formed of material normally volatilizable in the lost-wax process, and including a yoke supporting a pair of axially aligned trunnion patterns positioned in said bearing cups, said yoke including a stop bar positioned relative said shank to limit movement of the restoration section away from said ridge.

16. The subject matter of claim 15 in which each bearing cup is formed generally as an inwardly directed cone and in which each trunnion is generally conical to fit the associated bearing cup.

17. Means for forming a stress-breaker in a dental restoration that includes a clasp section to engage an abutment tooth and a restoration section to straddle a ridge of the mouth adjacent such abutment tooth, comprising: a metallic first hinge member having a shank to be anchored to said restoration section and a pivot head at one end of said shank; a pattern element of a second hinge member pattern, to be reproduced as a cast-in-place hinge member carried by said clasp section, formed of material normally volatilizable in the lost-wax process, and including means forming a socket to receive said pivot head for hinging operation, said pattern element including a member to abut said shank in spaced relation to said pivot head to limit movement of the restoration section away from its ridge.

18. A dental restoration having a clasp section for engagement with an abutment tooth, a restoration section for application to the ridge of the mouth, and a stress-relieving hinge connection between said sections, comprising: a metallic first hinge part secured to one of said sections and having a pair of spaced arms, a metallic second hinge part having a lug fitting between the spaced arms of said first hinge part, and oppositely directed axially aligned and generally transversely disposed trunnions on one of said hinge parts and engaging in recess means in the other hinge part for relative pivotal movement between said sections in a generally vertical direction.

19. A dental restoration according to claim 18 wherein at least one of said hinge parts is provided with stop means forming an abutment for limiting movement of said restoration section away from said ridge.

20. A dental restoration according to claim 18 wherein said trunnions and said recess means in which said trunnions engage are of generally conical form.

21. A dental restoration according to claim 18 wherein said trunnions are of generally conical form and project in opposite directions from the arms on said first hinge part, and said recess means in which said trunnions engage is of generally conical form and disposed in axially aligned and oppositely facing relation in the opposite ends of the lug formed on the first hinge part and fitting between the arms on the second hinge part.

22. A hinge member having formed thereon a first hinge part composed of heat oxidizable metal for coaction with a second complementary hinge part adapted to be cast in hinge coaction with said first hinge part, and a pattern part corresponding generally to the shape of said complementary hinge part and carried on said hinge member in complementary coaction with said first hinge part for distribution as a unitary assembly therewith, said pattern part being composed of material eliminatable by heat from a mold and being in direct contact with the heat oxidizable metal of said first hinge part and eliminatable from the mold during application of heat sufficient to form on said first hinge part an oxide coating for preventing fusion of the second complementary hinge part to said first hinge part in casting the second complementary hinge part in hinge coaction with said first hinge part, whereby freedom of pivotal movement is assured between said first hinge part and said second complementary hinge part, one of said first hinge and pattern parts having axially aligned recesses and the other of said parts having axially aligned trunnions disposed in said recesses.

23. A hinge member according to claim 22 wherein the axially aligned recesses and trunnions are of conical form.

24. A hinge member according to claim 22 wherein the first hinge part has the axially aligned recesses therein and the pattern part has axially aligned trunnion pattern portions disposed in said recess.

25. A hinge member according to claim 22 wherein the pattern part has a portion composed of material eliminatable by heat from a mold and corresponding generally to the shape of stop means to be formed on the second complementary hinge part.

26. A hinge member according to claim 22 wherein the pattern part has a portion composed of material eliminatable by heat from a mold and corresponding generally to the shape of stop means to be formed on the second complementary hinge part and wherein the first hinge part and the second complementary hinge part are of form for hingedly connecting parts of a dental appliance.

References Cited in the file of this patent

UNITED STATES PATENTS

| | | |
|---|---|---|
| 2,023,645 | Newton et al. | Dec. 10, 1935 |
| 2,196,505 | Morton | Apr. 9, 1940 |
| 2,227,735 | Morton | Jan. 7, 1941 |
| 2,544,671 | Grange et al. | Mar. 13, 1951 |
| 2,550,436 | Yates | Apr. 24, 1951 |

FOREIGN PATENTS

| | | |
|---|---|---|
| 543,577 | Great Britain | Mar. 4, 1942 |

UNITED STATES PATENT OFFICE

CERTIFICATE OF CORRECTION

Patent No. 2,797,482                                             July 2, 1957

Eric H. Zahn

It is hereby certified that error appears in the printed specification of the above numbered patent requiring correction and that the said Letters Patent should read as corrected below.

Column 7, line 61, for "coating" read --coacting--; column 10, line 21, for "recess" read --recesses--.

Signed and sealed this 20th day of August 1957.

(SEAL)
Attest:
KARL H. AXLINE

Attesting Officer

ROBERT C. WATSON
Commissioner of Patents